United States Patent [19]
Walters et al.

[11] Patent Number: 4,462,738
[45] Date of Patent: Jul. 31, 1984

[54] FEED AND TRANSFER SYSTEM

[75] Inventors: Harry J. Walters, Fallston; Ralph D. Gerben, Glen Burnie, both of Md.

[73] Assignee: M. S. Willett, Inc., Cockeysville, Md.

[21] Appl. No.: 289,612

[22] Filed: Aug. 3, 1981

Related U.S. Application Data

[63] Continuation of Ser. No. 005,268, Jan. 22, 1979, abandoned.

[51] Int. Cl.³ ................ B65G 25/00; B65G 59/06
[52] U.S. Cl. ................................ 414/127; 74/56; 198/744; 414/131; 414/750; 413/49
[58] Field of Search ............... 414/125, 127, 131, 749, 414/750; 198/744; 74/56, 57; 413/49

[56] References Cited

U.S. PATENT DOCUMENTS

| | | | |
|---|---|---|---|
| 1,871,020 | 8/1932 | Wyzenbeek | 74/57 |
| 1,962,645 | 6/1934 | Krueger | 413/49 X |
| 3,011,464 | 12/1961 | Danly et al. | 414/131 X |
| 3,223,223 | 12/1965 | Fuhrmann | 198/744 |
| 3,620,381 | 11/1971 | McCaughey | 414/750 |
| 3,703,834 | 11/1972 | Beezer | 74/57 |
| 3,818,770 | 6/1974 | Sievers | 74/57 |
| 3,865,253 | 2/1975 | Healy | 74/57 X |

FOREIGN PATENT DOCUMENTS 2046376  3/1972  Fed. Rep. of Germany ......... 74/57

Primary Examiner—Leslie J. Paperner
Attorney, Agent, or Firm—James Creighton Wray

[57] ABSTRACT

A barrel cam turns with a shaft mounted on bearings in a cam box. Four linear bearings mounted on the outside of the box receive hollow slider tubes which are clamped to legs of an H-shaped frame which holds roller cam followers. Bearings and followers are lubricated with pressure fittings, and the cam box is drained. Parallel transfer bars connected to the frame support a feeder plate with spring loaded fingers and divider bars with inward facing forward and downward sloped channels to remove lower most articles from stacks and to feed the articles forward. The transfer bars have pockets which receive inserts with recesses for holding edges of articles. Some of the inserts have openings for receiving horizontally oriented spring loaded retainers with inward and upward sloping article engaging faces.

24 Claims, 20 Drawing Figures

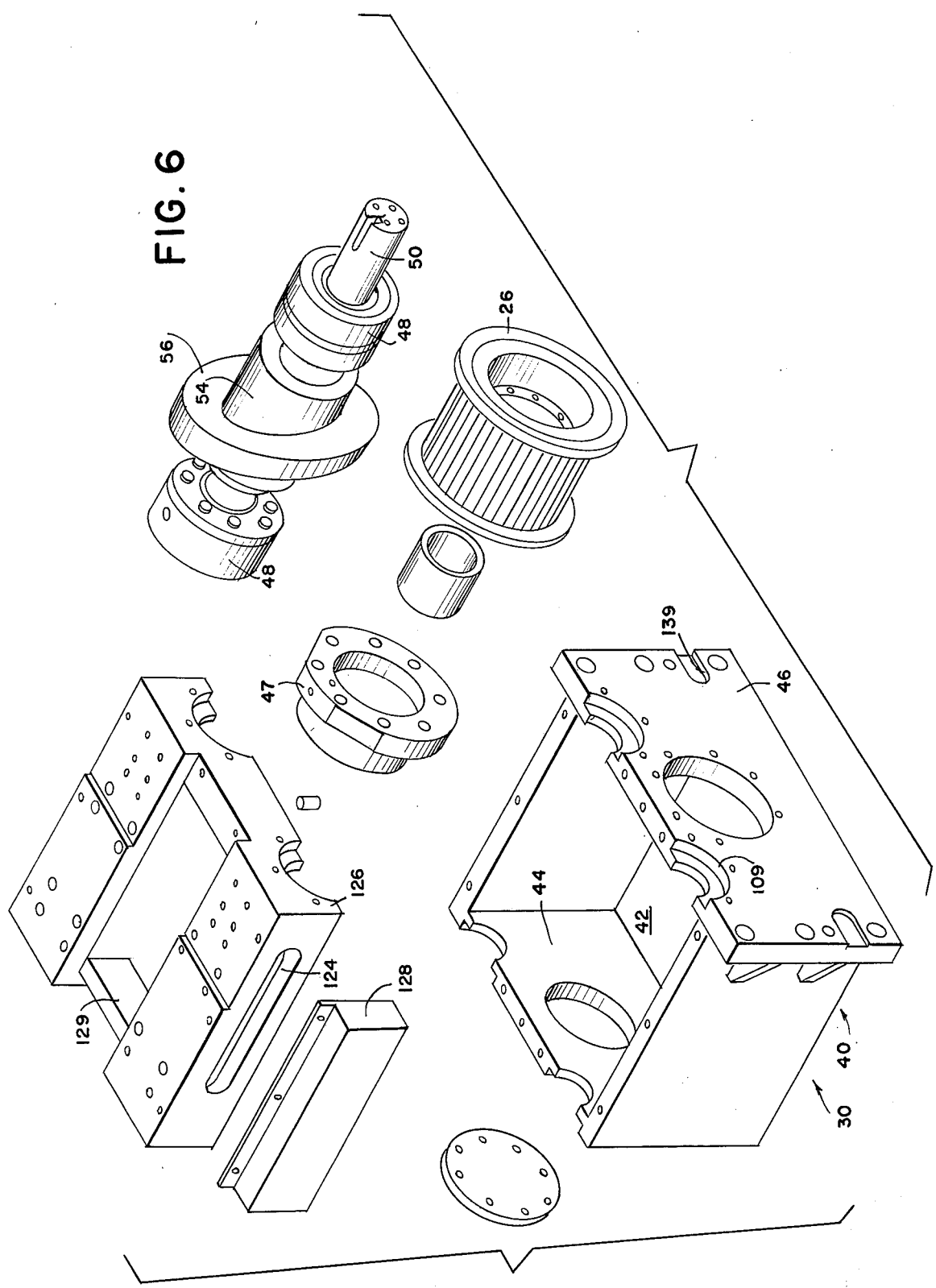

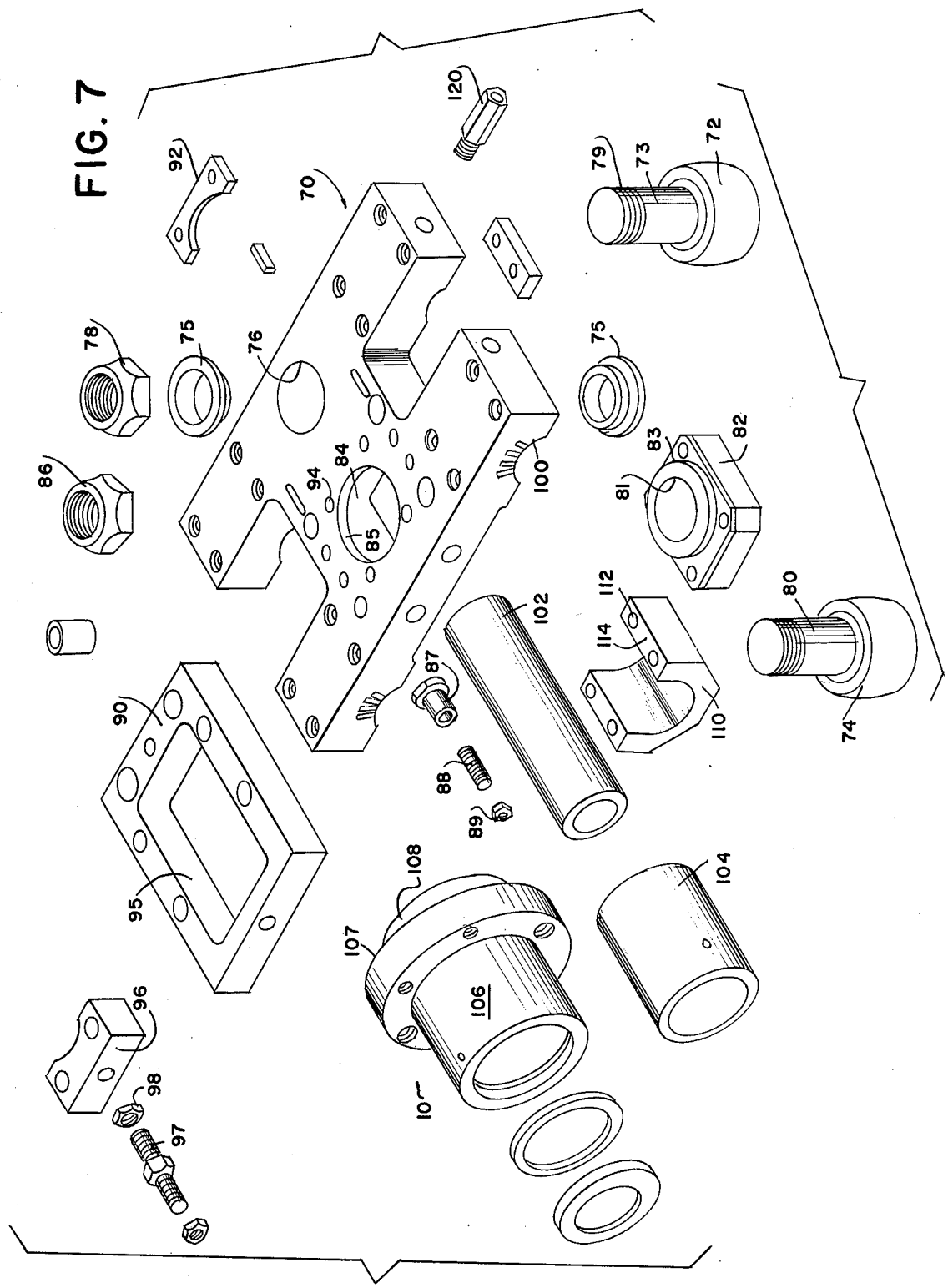

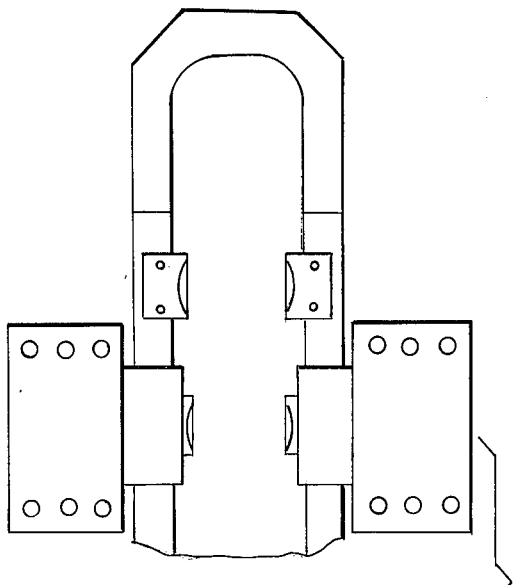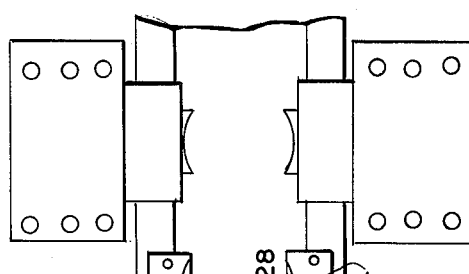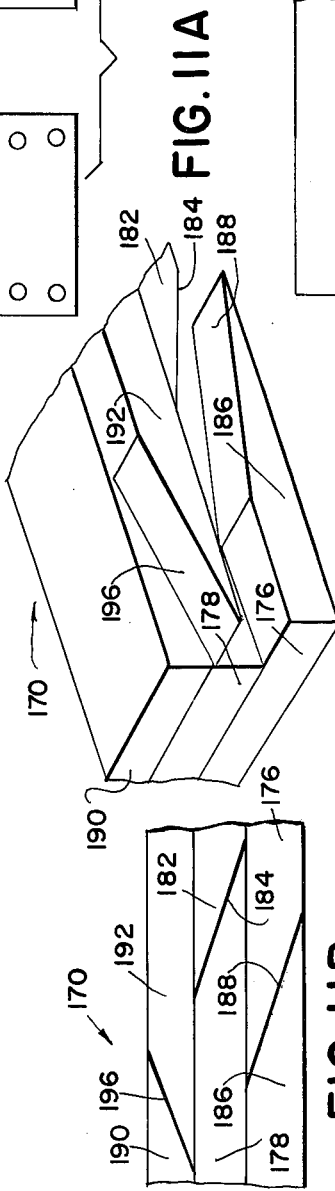

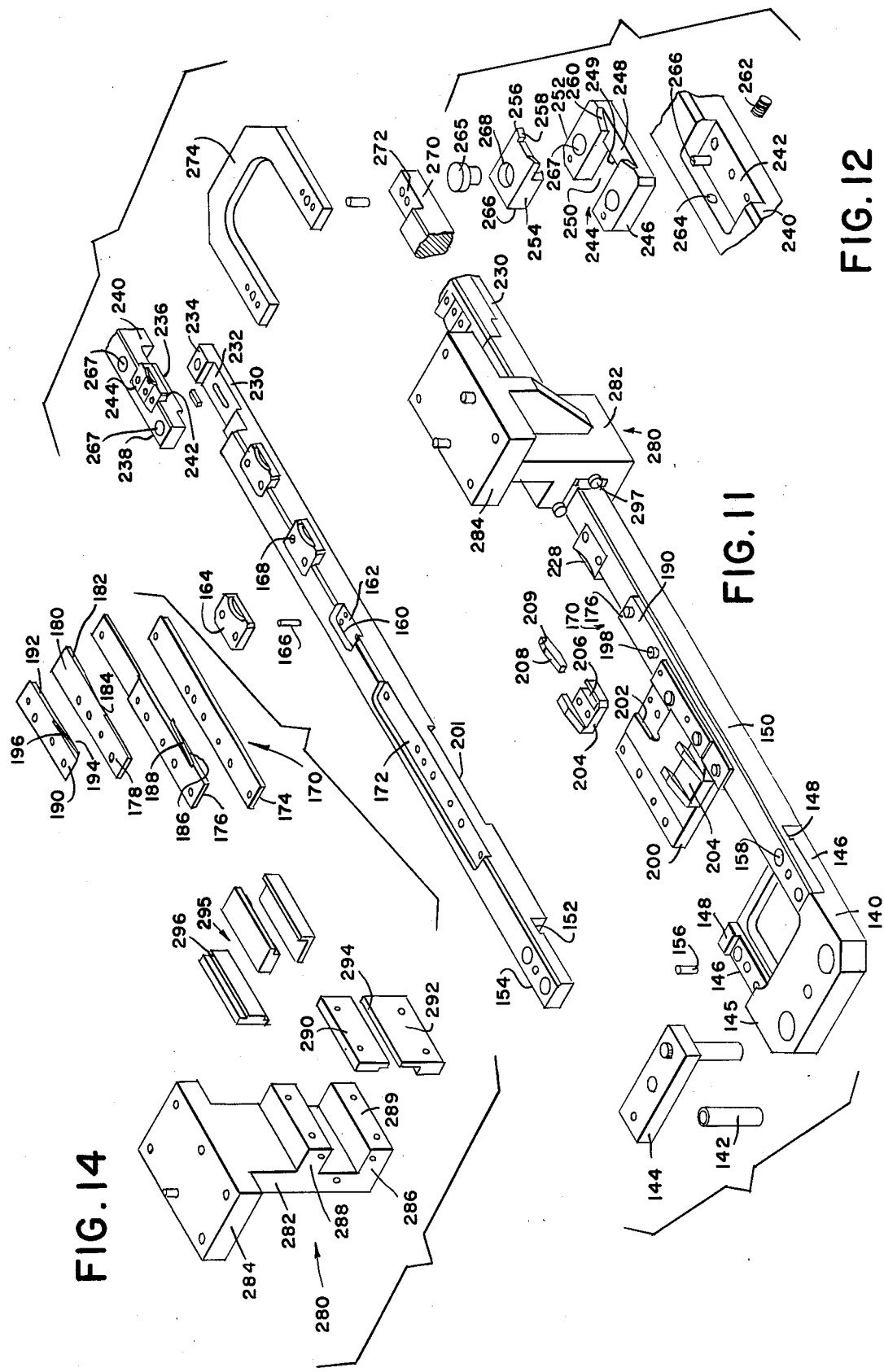

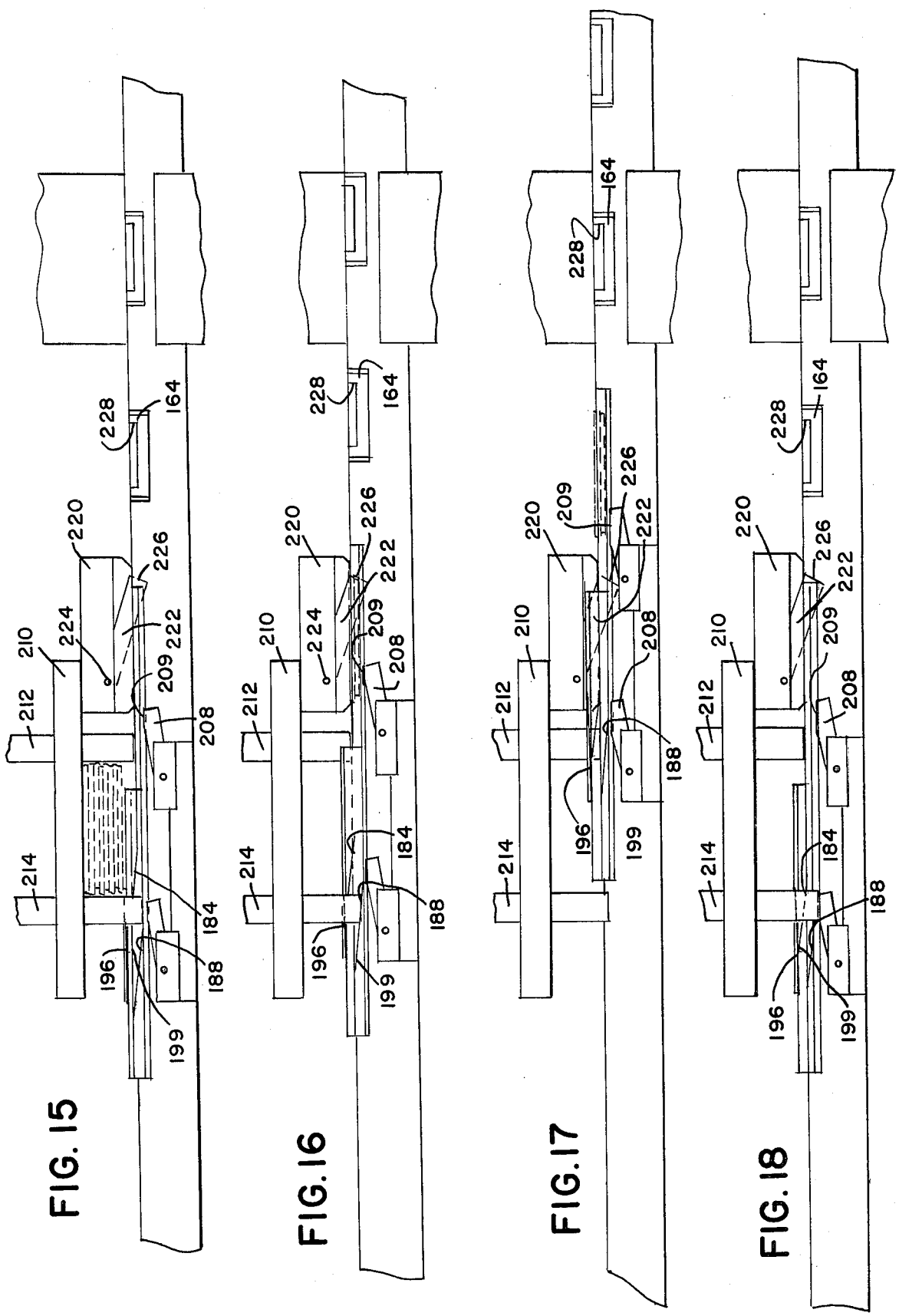

FEED AND TRANSFER SYSTEM

This application is a continuation, of application Ser. No. 005,268, filed 1-22-79, now abandoned.

BACKGROUND OF THE INVENTION

Feed and transfer systems for presses are well known. Generally the systems have had movements in three directions and six senses of directions upon each cycle or each stepping of an article to a next adjacent press station. An inward movement gripped the piece, an upward movement lifted the piece, a forward movement carried the piece to the next station. A downward movement deposited the article or workpiece at the next die station, an outward movement released the piece and a rearward movement returned the transfer to its original position for beginning the next forward stepping cycle.

Use of underdrive presses has reduced the necessary transfer steps. Upper dies are held stationary and lower dies move up to force and shape the articles against the upper dies. Since the upward movement of the lower dies may lift and remove the articles from the transfer, the transfer apparatus can avoid the lifting and lowering and gripping and releasing steps. Thus transfer movement can be limited to one direction and two senses of direction or simply pure forward and rearward reciprocation.

As a result press operations may be speeded and complexities of mechanical movements may be reduced. To increase reliability of the high speed systems, it is necessary that the transfer drive be accurate and capable of resisting torques and capable of many cycles of operation without losing accuracy. It is necessary that articles be fed into the transfer apparatus repeatedly at high rates of speed without jamming and it is necessary that the transfer have provisions for gripping the article securely against floating and turning without scoring or scratching or otherwise damaging parts of articles which are gripped. It is necessary to support the transfer bars with accuracy and at the same time the least resistance to sliding and cam loading as is possible.

Examples of prior art attempts and finding solutions to the on-going problems are found in patents collected in International Class B21D 43 and 51 and U.S. Class 113, subclasses 113 and 114.

SUMMARY OF THE INVENTION

In a preferred form of the invention a barrel cam turns with a shaft mounted on bearings in a cam box. Four linear bearings mounted on the outside of the box receive hollow slider tubes which are clamped to legs of an H-shaped frame which holds roller cam followers. Bearings and followers are lubricated with pressure fittings, and the cam box is drained. Parallel transfer bars connected to the frame support a feeder plate with spring loaded fingers and divider bars with inward facing forward and downward sloped channels to remove lower most articles from stacks and to feed the articles forward. The transfer bars have pockets which receive inserts with recesses for holding edges of articles. Some of the inserts have openings for receiving horizontally oriented spring loaded retainers with inward and upward sloping article engaging faces.

Feed and transfer apparatus of the present invention have a base, rotary bearings connected to the base, and a shaft mounted in the rotary bearings. Rotary drive means are connected to the shaft for turning a cam connected to the shaft. Plural linear bearings are connected to the base, and slides are supported in the linear bearings. A frame is connected to the slides, and followers are mounted on the frame and connected to the cam, and feed and transfer apparatus connected connection means mounted on the frame.

The base has first and second vertical ends and the rotary bearings are mounted in alignment in the first and second vertical ends, and first and second linear bearings in pairs are connected to the first and second vertical ends parallel to the roller bearings.

Preferably the linear bearings are mounted on outer, remote sides of the first and second vertical ends to resist torque on the frame produced by the cam and by transfer movements. Each linear bearing is mounted in a housing cantilevered outward from a vertical end. Each housing has a cylindrical section for receiving a linear bearing and a radially extending flange at one end thereof for connecting to a vertical end.

In preferred embodiments the slides are hollow bars which move in the linear bearings. Clamps connect the hollow bars to the frame. The clamps are preferably segmented recesses in an underside of the frame and complementary upward opening U-shaped lugs with tapped holes in upward spaced faces for receiving bolts extending through the frame.

In a preferred form the frame is H-shaped, having a central portion and four leg portions. Followers are connected to the central portion, and clamps are connected to the leg portions.

The followers are first and second rollers individually connected to the frame. A first roller is connected to the frame in relatively fixed position. Adjusting means connect the second roller to the frame.

The adjusting means in a preferred form is a first opening in the frame, and an adjusting frame secured to the frame and having a second opening larger than the first opening. A stop is secured to the frame near the first opening. A mounting block is relocatable in the adjusting frame. A jacking block mounted within the second opening moves the mounting block.

Preferably the base is a box; the bearings have oil seals at outboard ends. Pressure fittings and lines are connected to the bearings and followers and to a source of lubricating oil, and a drain is connected to the box.

In a preferred form of the invention, cantilever mounting means connects the base to a press. The mount has vertically oriented webs with a flange and faces for abutting the base and a press. The faces have recesses for aligning with complementary recesses in the base and press. Shear blocks mounted in the recesses sustain vertical stress and alleviate vertical shear stress on fasteners.

Connecting blocks preferably have upward extending locks at ends thereof remote from the large transverse section which is connected to the sliding frame. Transfer bars have recesses near end sections for receiving the locks and have complementary openings in end portions for receiving fasteners, whereby the transfer bars are joined and locked to the connecting block and the frame.

A preferred form of the feed has a plate connected to the connection means. Feeder blocks are connected to the plate, and feeder lugs are pivoted in the feeder blocks. Springs mounted between the feeder blocks and lugs urge forward portions of the lugs upward into engagement with articles. Forward portions of the lugs move downward against spring force during rearward movement. Preferably two feeder blocks are connected to each plate in forward and rearward alignment. Two feeder lugs are mounted on each feeder block in lateral alignment.

A stacker has guides for aligning stacked articles. An upper block connected to the stacker has an upper feeder lug pivoted therein. The forward portion of the upper lug extends downward toward the plate and is forced upward by articles moving forward with the plate. Divider bars connected to the connection means on opposite sides of articles to be fed have inward facing, downward and forward sloping channels. Edges of articles are engaged by upper rear corners of the channels upon rearward movement of the divider bars, and articles are urged downward by the channels during continued rearward movement of the divider bars. The divider bars are connected near the plate, and the channel moves articles toward the place. Stack guides extend downward along and inward of the divider bars. The guides prevent articles from moving rearward with the divider bars and cause articles to move downward in the channels.

Preferably the divider bars have forward and upward extending ramps above upward openings of the channels for upward urging of next above articles in a stack, so that only a lowermost article moves downward in the channels.

In a preferred form each divider bar has an upper ramp plate, an upper channel surface plate, a lower channel surface plate, and a spacer plate.

Transfer bars preferably have opposite pockets in inward facing edge portions thereof for receiving feeder or transfer elements. Distal ends of the transfer bars have first locks, and extension transfer bars have second complementary locks interfitting with the first locks. Fasteners extend through the bars at the locks to secure the bars together. The extension bars have a U-shaped bar interconnection secured to distal ends.

Feed plates in a preferred embodiment mounted in lower, inward, and downward opening pockets of the transfer bars extend across the bars. Divider bars are mounted in adjacent upper, inward, and upward opening pockets.

Article edge holders have bodies configured for mounting in the pockets with parts of the bodies preferably projecting inward from the transfer bars and have article edge-conformed recesses for receiving and holding article edges. Complementary bores in the bodies and pockets receive locating pins.

In a preferred embodiment the holders have receivers transversely oriented to the direction of reciprocation. Retainers are mounted in the receivers for movement transverse to the direction of reciprocation. Springs urge the retainers inward toward opposite transverse bars and toward articles therebetween.

Preferably the retainers have inward and upward sloping faces in substantial continuation of curved article edge engaging recesses in the holders. In a preferred form each retainer has plural inward faces separated by a gap.

In preferred embodiments holders are U-shaped with a base of the "U" being positioned outward and with an upper portion of the base of the "U" forming the recess. The recess has a central open portion in continuation of an open center of the "U", which together form a receiver. The retainer has a large portion positioned within the open center of the "U" and has spaced fingers which project into the central open portion of the recess. The fingers have inward terminal faces which are upward and inward sloping. The large portion of the retainer positioned within the open center of the "U" together form a restraint. A spring positioned in complementary spring receiving bores in a vertical face of the pocket and in an outer face of the retainer.

Supports are connected to the transfer bars. Each support comprises an inverted F-shaped member having a flange at an upper end for connecting to a fixed upper bed of a press. First and second lower horizontal parts respectively underly and overly a transfer bar. A vertical part is connected to the horizontal parts and the upper flange. End plates connected to distal faces of the horizontal parts define a slot for permitting passage of articles and article holders. Interfitting slide bearing blocks are placed within a bar receiving annulus formed by the horizontal parts, a portion of the vertical part between the horizontal parts, and the end plates. The transfer bars contact the bearing blocks.

BRIEF DESCRIPTION OF THE DRAWINGS

FIGS. 6 is an exploded view of parts of the drive apparatus shown in FIGS. 4 and 5.

FIG. 7 is an exploded detail of parts of the drive apparatus shown in FIGS. 4 and 5.

FIG. 9 is a plan view of the feed and transfer apparatus of the present invention used on the press shown in FIGS. 1 and 2.

FIG. 10 is an elevation of the plan shown in FIG. 9.

FIG. 11 is a perspective detail of the feed and transfer apparatus shown in FIGS. 9 and 10.

FIGS. 11a and 11b are schematic assembly details of the divider bars shown in FIG. 11.

FIG. 12 is a detail of a retainer used in the transfer of the present invention.

FIG. 14 is an exploded view of the support shown in FIG. 13.

FIGS. 15–18 are side elevational views illustrating sequentially the operation of the feed and transfer apparatus shown in FIG. 10.

DETAILED DESCRIPTION OF THE DRAWINGS

Figure 1:
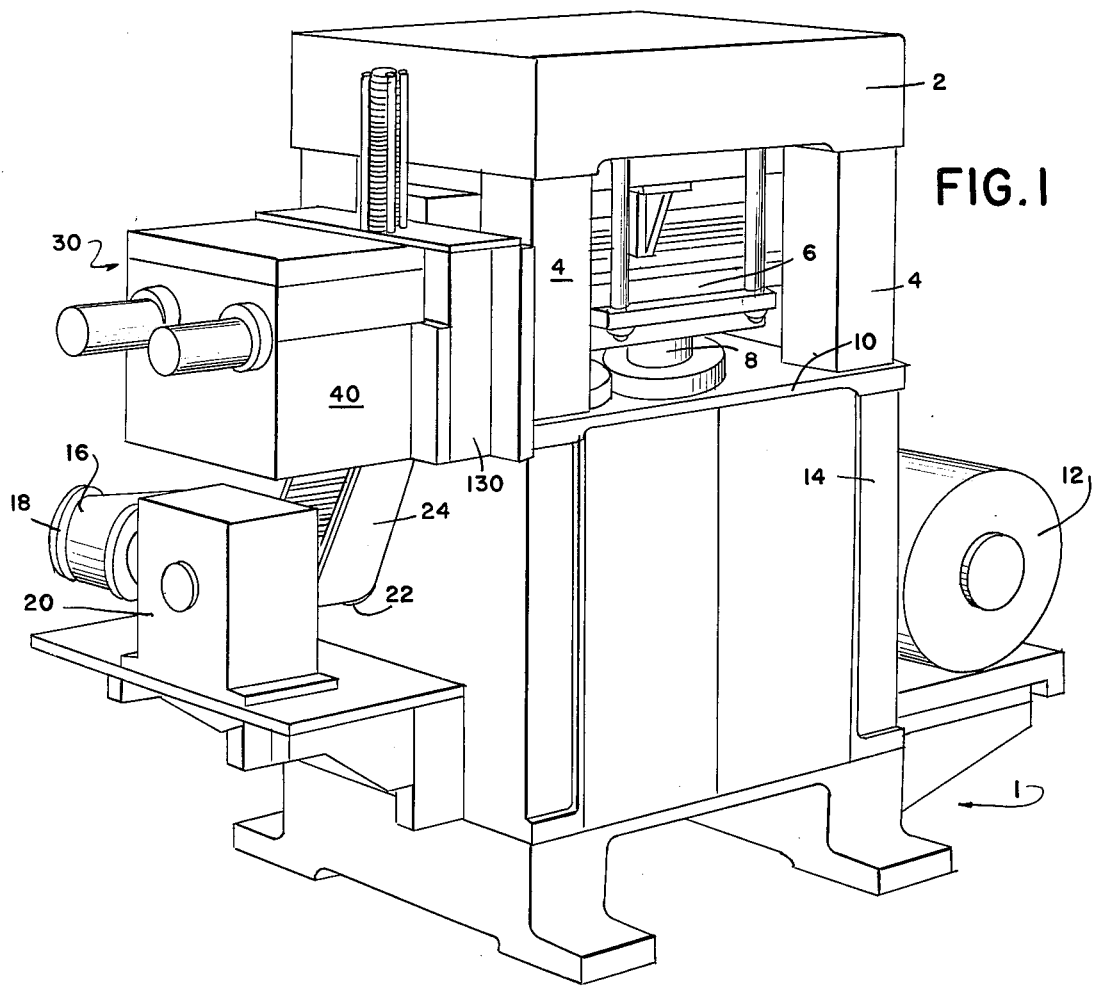
FIG. 1 is a perspective view of an underdrive press having a feed and transfer apparatus of the present invention.
Figures 2, 3:
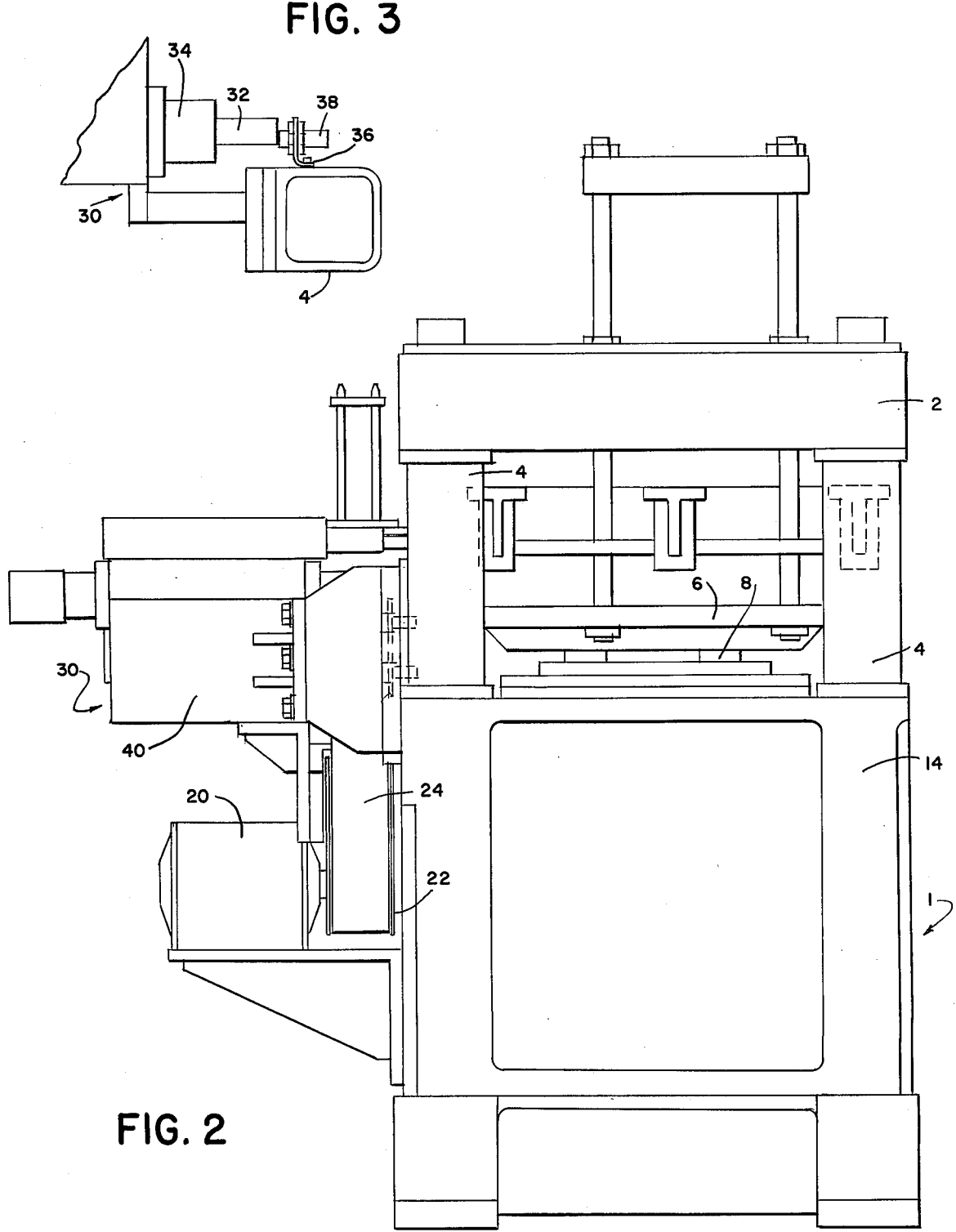
FIG. 2 is a side view of the underdrive press showing FIG. 1.
FIG. 3 is a detail of a proximity sensor used in the underdrive press of FIG. 1.

Referring to FIGS. 1 and 2, an underdrive press is generally referred to by the numeral 1.

Fixed upper dies are mounted on a fixed upper press bed 2 which is supported on the lower section of the press by columns 4. Lower movable dies are located on a main press ram 6 which is mounted on two long, large diameter pistons 8 coming up through the crown 10 of the press. A motor 12 drives the pistons 8 through dual eccentric shafts located within the housing 14 of the press. A power takeoff timing belt 16 drives a pulley 18 and gears in housing 20. Pulley 22 drives timing belt 24 which in turn drives a pulley 26 connected to the press feed and transfer drive, generally indicated by the numeral 30.

As shown in FIG. 3, a reciprocating slide 32 extends outward from bearing 34 in the direction of one of the columns 4. A bracket 36 on the column supports a proximity sensor 38 which signals overtravel of the slide 32 to stop the press operations.

With further reference to FIGS. 4 through 8 it can be seen that the feed and transfer drive apparatus 30 is constructed as a box 40 having a bottom 42 and first and second vertical ends 44 and 46. Rotary bearings 48 are mounted in alignment in the first and second ends to support a shaft 50 on which toothed drive pulley 26 is mounted. Cam 52 is also mounted on the shaft and the cam has a cylindrical portion 54 and a radially extending cam flange 56.

One bearing fits in housing 47 secured to end wall 46. Bearings 48 are preferably tapered roller bearings having tapered rollers 58.

Pressure fittings 60 supply lubricating oil under pressure through channel 62 to both tapered rollers 58.

The press is lubricated with a recirculating, high-pressure, high-volume oil system. The transfer lubrication system is supplied directly from the main press oil system and recirculates back to the main press system. The oil passes through a pressure reducing valve to a distribution manifold and then through separate flexible tubes to each lubrication point. An oil seal 64 prevents flow of oil outward along the shaft. Base 40 is formed as a box, entrapping all of the oil, which flows out through an outlet 66 in the center of the base 42 back to recirculating apparatus in the press body.

Figure 4:
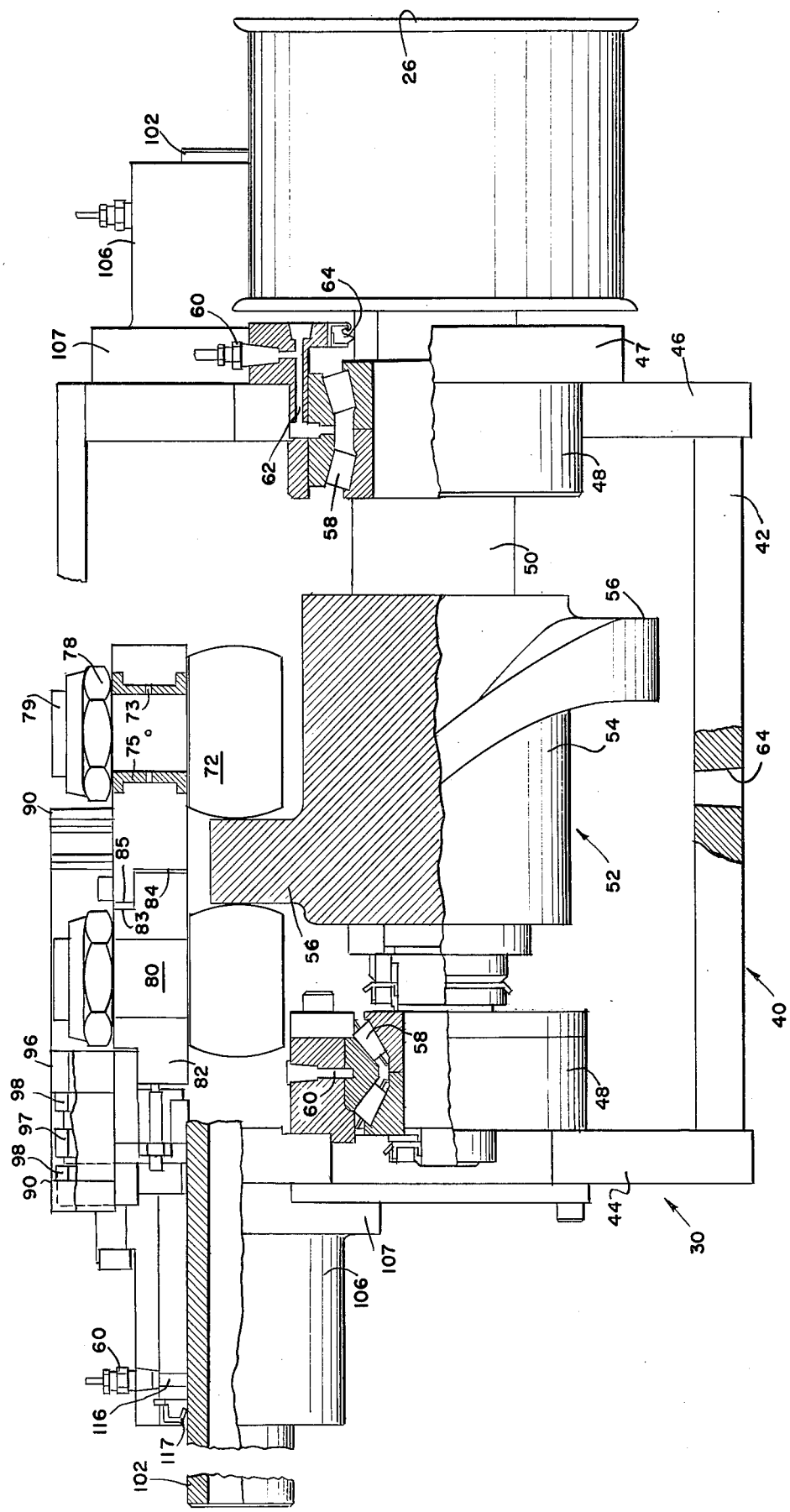
FIG. 4 is an elevation, partially in section of the feed and transfer drive system.
Figure 5:
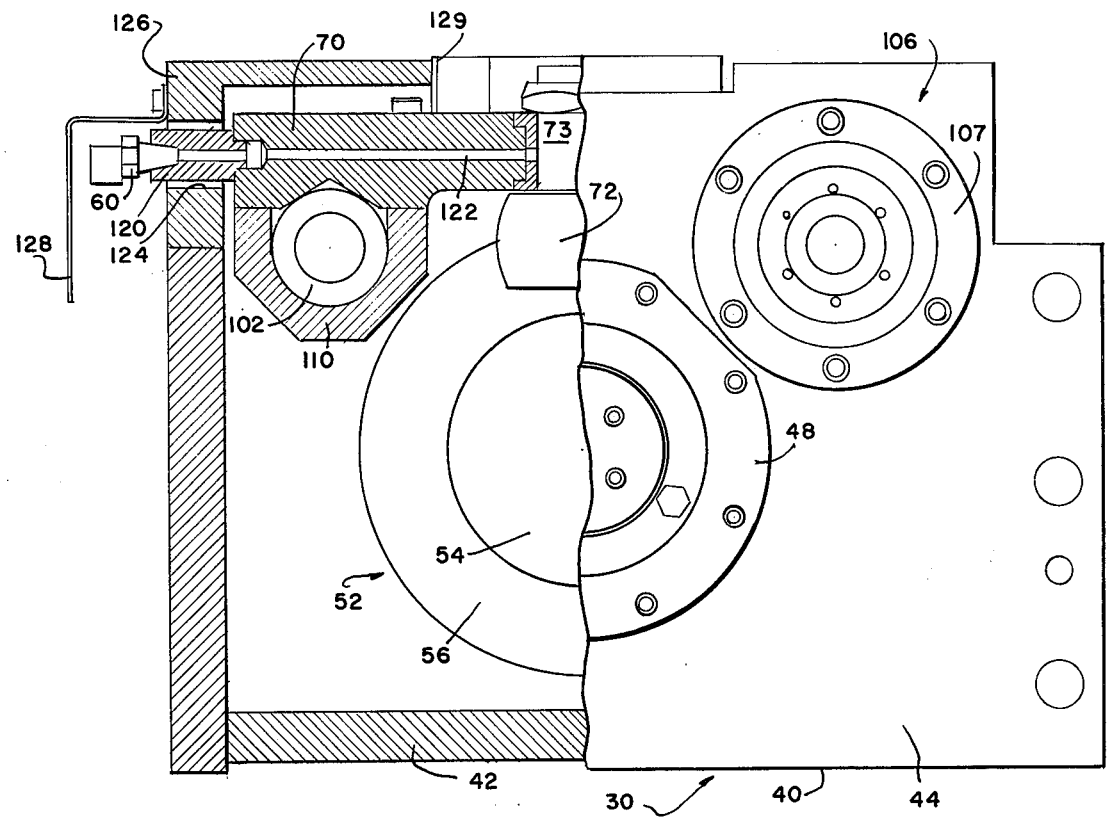
FIG. 5 is an end view, partially in elevation of the drive shown in FIGS. 4, 2, and 1.

With particular reference to FIGS. 4, 5, and 7, an H-shaped sliding frame 70 is mounted within the box for supporting cam follower rollers 72 and 74.

The shaft 73 of roller 72 tightly fits in collars 75 which fit in hole 76 in the H-shaped frame 70. Nut 78 engages screw threads 79 on shaft 73, securing the shaft in position.

Shaft 80 fits in hole 81 in adjusting block 82. The adjusting block and its collar 83 fit loosely within openings 84 and 85 in the H frame. Nut 86 holds shaft 80 assembled in the adjusting block 82. Two adjusting nuts 87 receive threaded adjusting pins 88 which are locked in place with nuts 89 after adjusting block 82 is moved by pins 88 to adjust the roller 74 for proper clearance.

Adjusting plate 90 is positioned on the top of the block and stop 92 is fastened with bolts to holes 94 and fits within opening 95 in the adjusting frame. Jacking block 96 fits within opening 95 and jacking screw 97 has opposite threads which fit into respective threaded openings in jacking block 96 and adjusting frame 90. Locking nuts 98 secure the jacking screw in the desired position.

Frame 70 has segmental recesses 100 in lower surfaces of legs of the frame. The curved surfaces 100 receive slide bars 102 which are formed of ground round hollow bars. The bars fit within linear bearings 104 which are mounted within housings 106 exteriorly on the vertical end plates 44 and 46 of base 40. Flanges 107 abut the outer faces of plates 44 and 46 and projections 108 fit within recesses 109 shown in FIG. 6. Bars 102 are clamped to frame 70 with clamps 110 and four bolts which thread into tapped holes 112 in flat upper surfaces 114 of the clamps.

As shown in FIG. 4, pressure fittings 60 are connected to housing 106 to supply oil through channels 116. Wipers 117 prevent outward egress of the oil so that excess oil flows through the bearing and drains into base 40.

As shown in FIG. 5, pressure fittings 60 are connected to extensions 120 to provide oil through channels 122 to shafts 73 and 80 of rollers 72 and 74. The extensions 120 extend outward through elongated openings 124 in cover 126 which completes the base 40. Shield 128 prevents direct access to the moving extensions 120 in holes 124.

An upward opening 129 in cover 126 allows passage of the elements connected to the top of frame 70.

Figure 8:
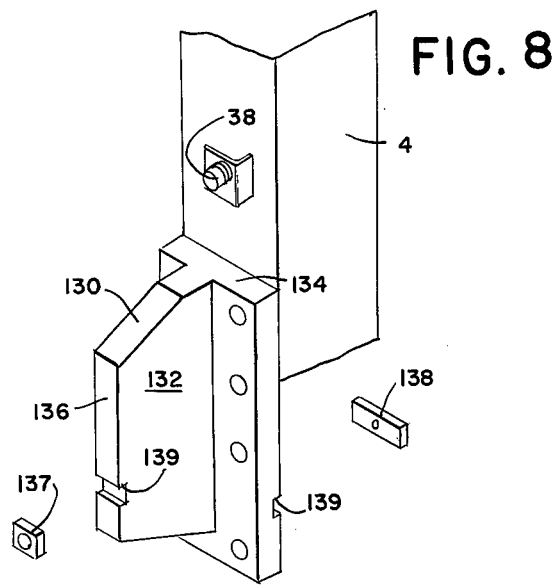
FIG. 8 is a detail of the mounting of the drive apparatus on the press.

As shown in FIG. 8, a T-shaped mounting member 130 connects drive base 40 to support columns 4 of the press bed. Each of two mounting blocks 130 has a vertical web 132, a flange 134 at one end and a face 136 at the other. Horizontal shear blocks 137 and 138 are positioned in horizontal openings 139 and project into complementary openings in a face of drive base 40 and the press member to remove vertical shear forces from fasteners which extend between the base 40 and support 130 and support 130 and column 4. The position of proximity sensor 38 is also shown in FIG. 8.

With reference to FIG. 9, 10, and 11, a mounting block generally indicated by the numeral 140 is secured with pins 142 and plate 144 to frames 70. Mounting block 140 has a large end 145 which is secured to frame 70 and has forward extending legs 146 with upward extending locks 148 at distal ends. Transfer bars 150 have complementary lock recesses 152 which receive projections 148. Proximal ends 154 overly 146 and are connected thereto by shear sustaining pins 156 and fasteners 158. Bars 150 have pockets generally indicated by the numeral 160 for holding feed and transfer apparatus. Pockets 162 are created in upper and inside edges of transfer bars 152 to receive article holders 164 which are connected in the pockets with locator pins 166 and fasteners 168.

Divider bars generally indicated by the numeral 170 are received in elongated upward and inward opening pockets 172 in transfer bars 150. A lower spacer bar 174 is fitted in the bottom of the pocket. A lower channel forming bar 176 is placed on top of the first bar and an upper channel forming bar 178 is placed on top of the lower channel forming bar. Upper channel forming bar 178 has a flat upper face 180 and an outward extension 182, which has a downward and forward sloping underside 184. Lower channel forming bar 176 has a flat lower surface and an outward extension 186 with a downward and forward upper face 188. When bars 176 and 178 are placed together, sloping surfaces 184 and 188 together form a channel for downward movement of articles upon rearward movement of the transfer bars 150. Upper divider bar 190 has an outward extension 192 which overlies outward extension 182 of bar 178. A bottom surface of bar 190 is flat. A portion 194 of outward extension 192 has an upward and forward sloping ramp 196 which lifts edges of next above articles upon rearward movement of the transfer bars while lowermost articles are moving downward in the channels formed by bars 176 and 178. Locating pins and fasteners 198 complete the assembly of divider bars 170 in pockets 172, thereby forming channel 199.

A feed plate 200 is mounted in downward and inward opening pockets 201 in transfer bars 150. Plate 200 has forward and rearward aligned recesses 202 for receiving feed blocks 204. Each block has openings 206 for receiving pivoted lugs 208 which are urged upward by springs. As transfer bars 150 carry feed plate 200 and blocks 204 rearward, forward portions 209 of lugs 208 are depressed.

As shown in FIG. 10, stacker platform 210 is supported in fixed relationship above transfer bars 150. Stacker platforms 210 may be connected to the drive base 40. Forward and rearward vertical stacker bars 212 and 214 are fixed in platform 210 and extend downward therefrom. As shown in FIG. 10, rear stacker bars 214 extend downward slightly farther than forward stacker bars 212. The difference in downward extension is the thickness of an article to be fed. Rearward stacker bars 214 prevent rearward egress of articles. As the conveyor bars 150 move rearward, articles are held by rear stacker bars 214 and divider bars 170 force edges of a lowermost article to move downward in channel 199. Ramps 196 lift the next above articles. Forward ends 209 of lugs 208 move downward upon rearward movement of the transfer bars. Upon forward movement of the bars, lugs 208 push articles forward. Inverted feed block 220 is suspended at a forward position from platform 210. Lug 222 is pivoted therein around pivot 224 and a spring urges forward end 226 of the lug downward. Articles moving forward on the conveyor lift forward end 226 of lug 222. As feed bars move rearward, lugs 226 retain the articles in forward position and cause edges of the articles to be transferred from the lower inward edges of guide bars 174 to recesses 228 in first holders 164.

Lower dies on the raising ram of press 1 contact lower sides of the articles and lift the articles from forward ends of guide bars 174 and from recesses 228 in holders 164. Subsequent rearward movement of the transfer bars 150 and dropping of the ram step the articles from holder to holder along the transfer bars.

Distal ends 230 of transfer bars 150 have recesses 232 and upward extending blocks 234 for engaging complementary structure 236 in proximal ends 238 of extension bars 240. Extension bars 240 have upward and inward opening pockets 242 for receiving holders 244.

As shown in FIG. 12, holders 244 have U-shaped bodies 246. An upper half of the base 248 of the U is removed and an opening is formed thereby in extension of the opening 250 between legs 252 of the U-shaped body. Retainer 254 is received in opening 250 and fingers 256 project above base 248 of the U; outward and downward sloping faces 258 of the fingers lie in a general continuation of arcuate recesses 260 in bodies 244. Spring 262 is positioned in a bore 264 formed in the rearward wall of pocket 242 and in a like bore in the rear face 266 of retainer 254. Holder body 244 is secured in pocket 242 with locator pins 266 and fasteners 267 so that the main body 244 is tightly secured in the pocket. Opening 268 is slightly larger than fastener 269 so that retainer 254 is free to move slightly forward and rearward in opening 250.

Spring 262 urges retainer 268 inward toward the opposite retainer. The rear face 249 of base 248 of the U-shaped member 244 together with fastener 269 acts as a restraint.

In operation, placing articles in recesses 260 forces fingers 256 rearward against force of spring 262. Articles are held between opposite retainers against rotation, but the articles may be easily removed from the retainers by upward movement of the lower dies.

Figure 13:
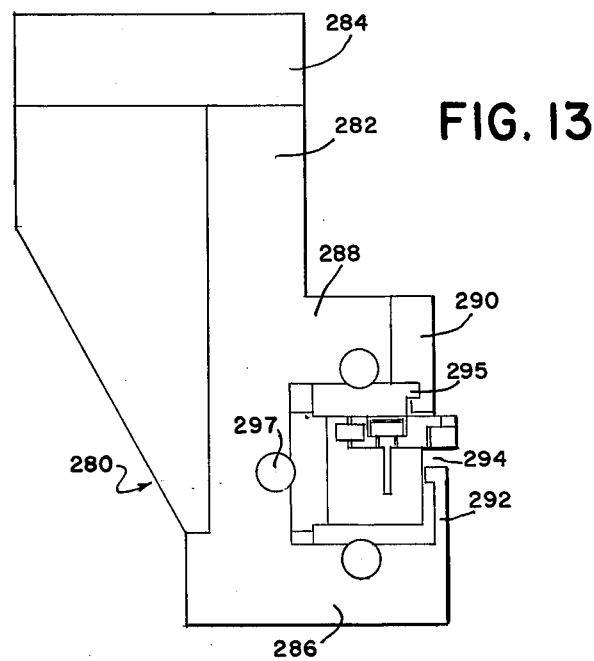
FIG. 13 is an elevation of a transfer support used in the present invention as shown in FIGS. 1, 2, 9, 10, and 11.

Distal ends 270 of extension transfer bars 240 are recessed 272 to receive U-shaped connectors 274. As shown in FIGS. 13 and 14, transfer bar supports 280 have inverted F-shaped bodies 282. Upper horizontal flanges 284 are connected to the stationary upper bed of the press 1. Horizontal elements 286 and 288 have end faces 289 which receive end plates 290 and 292. The end plates have a space 294 therebetween for permitting passage of holders 164 and 244 and articles therein. Bearing blocks 295 with interfitting edges 296 are positioned in the opening formed between the upper and lower horizontal elements 286 and 288 and end plates 292 and 290. Fasteners 297 secure the blocks in the supports.

While the invention has been described with reference to a specific embodiment, modifications and variations of the invention may be constructed without departing from the scope of the invention which is defined in the following claims.

We claim:

1. Feed and transfer apparatus comprising
a base,
rotary bearings connected to the base,
a shaft mounted in the rotary bearings,
rotary drive means connected to the shaft for turning the shaft,
a cam connected to the shaft for turning with the shaft,
plural linear bearings connected to the base,
slides supported in the linear bearings,
a frame connected to the slides,
followers mounted on the frame and connected to the cam,
reciprocating drive connection means connected to the frame for reciprocating with the frame,
feed and transfer apparatus connected to the frame, the base comprising first and second vertical ends and connecting means for connecting the ends wherein the rotary bearings comprise first and second bearings respectively connected in alignment in the first and second vertical ends wherein the linear bearings comprise plural pairs of linear bearings and wherein each pair comprises first and second linear bearings respectively connected to the first and second vertical ends and aligned therein parallel to the roller bearings, the slides comprising hollow bars moving in the linear bearings and further comprising clamps connected to the frame and clamping the hollow bars to the frame, the clamps comprising segmented recesses in an underside of the frame and complementary upward opening U-shaped lugs with tapped holes in upward spaced faces thereof for receiving bolts extending through the frame, cantilever mounting means for connecting the base to a press, the mounting means having vertically oriented webs with first and second vertical ends and a flange on at least one end and faces for abutting the base and a press, and having openings for receiving fasteners, and the faces having recesses for aligning with complementary recesses in the base and a press and shear blocks mounted in the recesses for sustaining vertical stress and alleviating vertical shear stress on the fasteners, a plate connected to the connection means, feeder blocks connected to the plate, feeder lugs pivoted in the feeder blocks and springs mounted between the feeder blocks and lugs for urging forward portions of the lugs upward into engagement with articles whereby forward portions of the lugs move downward against spring force upon rearward portions of reciprocal movement, a stationary stacker fixed relatively to the base above the plate, the stacker having guides for aligning stacked articles, an upper block connected to the stacker, and an upper feeder lug pivoted therein and having a forward portion extending downward toward the plate whereby the forward portion of the upper lug is forced upward by articles moving forward with the plate upon forward portions of reciprocal movement, divider bars connected to the connection means on opposite sides of articles to be fed, the divider bars having inward facing, downward and forward sloping channels whereby edges of articles to be fed are engaged by upper rear corners of the channels upon rearward movement of the divider bars, and articles are urged downward by the channels during continued rearward movement of the divider bars, the divider bars being connected near the plate whereby the channel moves articles toward the plate and the guides extending downward along and inward of the divider bars whereby the guides prevent articles from moving rearward with the divider bars and thereby cause articles to move downward in the channels, divider bars connected to the connection means on opposite sides of articles to be fed, the divider bars having inward facing, downward and forward sloping channels whereby edges of articles to be fed are engaged by upper rear corners of the channels upon rearward movement of the divider bar, and articles are urged downward by the channels during continued rearward movement of the divider bars, the divider bars comprising inward and forward and upward extending ramps above upward openings of the channels for upward urging next above articles in a stack whereby only a lowermost article moves downward in the channels, each divider bar comprising an upper ramp plate, an upper channel surface plate, a lower channel surface plate, and a spacer plate connected together and to the connection means, first and second parallel spaced transfer bars connected to the connection means and aligned in a direction of reciprocal movement, the transfer bars having opposite pockets in inward facing edge portions thereof for receiving feeder or transfer elements, and distal ends of the transfer bars remote from the connection means having first and second complementary locks and further comprising extension transfer bars having proximal ends adjacent the distal ends of the transfer bars, the proximal ends having second complementary locks and fasteners extending through the bars at the locks to secure the bars together, the extension bars having remote distal ends and further comprising a U-shaped bar interconnection secured to the remote distal ends, feeder plates mounted in lower, inward, and downward opening pockets of the transfer bars and extending across the bars and divider bars mounted in adjacent upper, inward, and lower opening pockets, article edge holders having bodies configured for mounting in the pockets with parts of the bodies projecting inward from the transfer bars and having article edge-formed recesses for receiving and holding article edges, locating pins and complementary bores in the bodies and pockets for receiving the pins, the article edge holders comprising receivers transversely oriented to direction of reciprocation and further comprising retainers connected to the receivers and mounted therein for movement transversely to the direction of reciprocation springs connected to the retainers for urging the retainers inward toward opposite transverse bars and toward articles therebetween, and restraints for limiting inward movement of the retainers, the retainers having inward and upward sloping faces in general continuation of the article edge engaging recesses in the holders, each retainers having plural inward faces separated by a gap, the article edge holders further being U-shaped with a base of the "U" being positioned outward and with the upper portion of the "U" base forming the recess, the recess having a central open portion in continuation of an open center of the "U", which together form a receiver, wherein the retainer has a large portion positioned within the open center of the "U" and has spaced fingers which project into the central open portion of the recess, the fingers having inward terminal faces which are upward and inward sloping, the large portion of the retainer positioned within the open center of the "U" together forming the restraint, and a spring being positioned in complementary spring receiving bores in a vertical face of the pocket and in an outer face of the retainer, and supports connected to the transfer bars, each support comprising inverted F-shaped members having an upper support flange at an upper end thereof for connecting to a fixed upper bed of a press, having first and second lower horizontal parts for respectively underlying and overlying a transfer bar and having a vertical part connected to the horizontal parts and the upper flange, end plates connected to the distal faces of the horizontal parts and defining a slot therebetween for permitting passage of articles and article holders, and interfitting slide bearing blocks placed within a bar receiving annulus formed by the horizontal parts, a portion of the vertical part between the horizontal parts, and the end plates, whereby the transfer bars contact the bearing blocks.

2. The feed and transfer apparatus of claim 1 wherein the linear bearings are mounted on outer, remote sides of the first and second vertical ends.

3. The feed and transfer apparatus of claim 2 wherein each linear bearing is mounted in a housing cantilevered outward from a vertical end, each housing having a cylindrical section for receiving a linear bearing and a radially extending flange at one end thereof for connecting to a vertical end.

4. The feed and transfer apparatus of claim 1 wherein the frame is H-shaped having a central portion and four leg portions and wherein followers are connected to the central portion and further comprising clamps connected to the leg portions and secured to the slides.

5. The feed and transfer apparatus of claim 1 wherein the followers comprise first and second rollers individually connected to the frame wherein a first roller is connected to the frame in relatively fixed position and further comprising adjusting means connecting the second roller to the frame.

6. The feed and transfer apparatus of claim 5 wherein the adjusting means comprises first opening in the frame, an adjusting frame secured to the frame and having a second opening larger than the first opening, stop means secured to the frame near the first opening, a mounting block connected to the adjusting frame and relocatable with respect thereto, a jacking block mounted within the second opening and connected to the mounting block and jacking means connected to the jacking block and to the frame for moving the jacking block in the second opening.

7. The feed and transfer apparatus of claim 1 wherein the base further comprises sides joined with the ends and bottom in completion of a box, wherein the bearings further comprise oil seals at ends thereof outboard of the box and further comprising pressure fittings and lines connected to the bearings and to a source of lubricating oil and a drain connected to the box.

8. The feed and transfer apparatus of claim 7 further comprising pressure fittings and lines connected to the followers and to the source of lubricating oil.

9. The feed and transfer apparatus of claim 1 wherein the connection means comprises a connecting block connected to the frame, the connecting block having a relatively large traverse section and means in that section for connecting to the frame and having spaced lateral sections with joining means for connecting transfer bars.

10. The feed and transfer apparatus of claim 9 wherein the joining means comprise upward extending locks at ends thereof remote from the large transverse section and openings for receiving fasteners and further comprising transfer bars having recesses near end sections for receiving said locks and having complementary openings in end portions for receiving fasteners whereby the transfer bars are joined and locked to the connecting block and the frame.

11. The feed and transfer apparatus of claim 1 wherein two feeder blocks are connected to each plate in forward and rearward alignment.

12. The feed and transfer apparatus of claim 11 wherein two feeder lugs are mounted on each feeder block in lateral alignment.

13. The feed and transfer apparatus of claim 1, further comprising limit sensing means relatively fixed with respect to the base and positioned in alignment within a slide near one limit of travel thereof for sensing over travel of the slide in a first sense of direction.

14. Rotary to reciprocal feed and transfer apparatus comprising
a base,
rotary bearings connected to the base,
a shaft mounted in the rotary bearings,
rotary drive means connected to the shaft for turning the shaft,
a cam connected to the shaft for turning with the shaft,
plural linear bearings connected to the base,
slides supported in the linear bearings,
a frame connected to the slides,
followers mounted on the frame and connected to the cam,
reciprocating transfer drive connection means connected to the frame for reciprocating with the frame, the base comprising first and second vertical ends and connecting means for connecting the ends wherein the rotary bearings comprise first and second bearings respectively connected in alignment in the first and second vertical ends wherein the linear bearings comprise plural pairs of linear bearings and wherein each pair comprises first and second linear bearings respectively connected to the first and second vertical ends and aligned therein parallel to the roller bearings, the slides comprising hollow bars moving in the linear bearings and further comprising clamps connected to the frame and clamping the hollow bars to the frame, the clamps comprising segmented recesses in an underside of the frame and complentary upward opening U-shaped lugs with tapped holes in upward spaced faces thereof for receiving bolts extending through the frame, and cantilever mounting means for connecting the base to a press, the mounting means having vertically oriented webs with first and second vertical ends and a flange on at least one end and faces for abutting the base and a press, and having openings for receiving fasteners, and the faces having recesses for aligning with complementary recesses in the base and a press and shear blocks mounted in the recesses for sustaining vertical stress and alleviating vertical shear stress on the fasteners.

15. The apparatus of claim 14 wherein the linear bearings are mounted on outer, remote sides of the first and second vertical ends.

16. The apparatus of claim 15 wherein each linear bearing is mounted in a housing cantilevered outward from a vertical end, each housing having a cylindrical section for receiving a linear bearing and a radially extending flange at one end thereof for connecting to a vertical end.

17. The apparatus of claim 14 wherein the frame is H-shaped having a central portion and four leg portions and wherein followers are connected to the central portion and further comprising clamps connected to the leg portions and secured to the slides.

18. The apparatus of claim 14 wherein the followers comprise first and second rollers individually connected to the frame wherein a first roller is connected to the frame in relatively fixed position and further comprising adjustment means connecting the second roller to the frame.

19. Apparatus of claim 18 wherein the adjusting means comprises first opening in the frame, an adjusting frame secured to the frame and having a second opening larger than the first opening, stop means secured to the frame near the first opening, a mounting block connected to the adjusting frame and relocatable with respect thereto, a jacking block mounted within the second opening and connected to the mounting block and jacking means connected to the jacking block and to the frame for moving the jacking block in the second opening.

20. The apparatus of claim 14 wherein the base further comprises sides joined with the ends and bottom in completion of a box, wherein the bearings further comprise oil seals at ends thereof overboard of the box and further comprising pressure fittings and lines connected to the bearings and to a source of lubricating oil and a drain connected to the box.

21. The apparatus of claim 20 further comprising pressure fittings and lines connected to the followers and to the source of lubricating oil.

22. The apparatus of claim 14 wherein the connection means comprises a connecting block connected to the frame, the connecting block having a relatively large traverse section and means in that section for connecting to the frame and having spaced lateral sections with joining means for connecting transfer bars.

23. The apparatus of claim 22 wherein the joining means comprise upward extending locks at ends thereof remote from the large transverse section and openings for receiving fasteners and further comprising transfer bars having recesses near end sections for receiving said locks and having complementary openings in end portions for receiving fasteners whereby the transfer bars are joined and locked to the connecting block and the frame.

24. The apparatus of claim 14 further comprising a proximity sensor fixed relatively to the base and positioned near an end of travel of a slide.

* * * * *